United States Patent
Ohms

Patent Number: 5,517,082
Date of Patent: May 14, 1996

[54] TRAVELING WAVE TUBE HEATING COIL POWER SUPPLY WITH VARYING FREQUENCY AC CURRENT LIMITING MEANS

[75] Inventor: Franz Ohms, Oberrot, Germany

[73] Assignee: Ant Nachrichtentechnik GmbH, Backnang, Germany

[21] Appl. No.: 240,697

[22] PCT Filed: Oct. 27, 1992

[86] PCT No.: PCT/DE92/00893

§ 371 Date: May 9, 1994

§ 102(e) Date: May 9, 1994

[87] PCT Pub. No.: WO93/09593

PCT Pub. Date: May 13, 1993

[30] Foreign Application Priority Data

Nov. 9, 1991 [DE] Germany .............. 41 36 879.7

[51] Int. Cl.⁶ .......... H05B 41/29; H02M 7/538
[52] U.S. Cl. .............. 315/97; 315/276; 315/3; 363/159
[58] Field of Search .............. 315/3, 94, 105, 315/106, 107, 219, 97, 99, 246, 276; 363/157, 159, 165

[56] References Cited

U.S. PATENT DOCUMENTS

| | | | |
|---|---|---|---|
| 4,171,514 | 10/1979 | Faxon | 315/105 X |
| 4,255,690 | 3/1981 | Lecornet | 315/106 |
| 4,257,089 | 3/1981 | Ravis | 363/25 |
| 4,267,487 | 5/1981 | Unetich et al. | 315/107 |
| 4,464,611 | 8/1984 | Hasili | 315/366 |
| 4,538,093 | 8/1985 | Melai | 315/219 |
| 4,701,671 | 10/1987 | Stupp et al. | 315/219 X |
| 4,816,720 | 3/1989 | Nomoto et al. | 315/94 |
| 4,906,901 | 3/1990 | Carroll | 315/219 X |
| 4,992,702 | 2/1991 | Shimizu et al. | 315/219 |

FOREIGN PATENT DOCUMENTS

| | | |
|---|---|---|
| 006785 | 1/1980 | European Pat. Off. . |
| 0006785 | 1/1980 | France . |
| 2579822 | 4/1989 | France . |

OTHER PUBLICATIONS

Space Amplifier at 20/30 GHz; ANT Telecommunications Prospectus; May 1984.
Travelling Wave Tube Amplifiers (TWTAs) for Space Applications; ANT Bosch Telecom Prospectus; Sep., 1990.
"Improvement Considerations for High Stability Radar"; Gardenghi et al; pp. 269–273; Westinghouse Electric Corp.

Primary Examiner—Benny Lee
Assistant Examiner—Justin P. Bettendorf
Attorney, Agent, or Firm—Loeb & Loeb

[57] ABSTRACT

A power supply for supplying the heating coils of a tube (WR), in particular a traveling-wave tube, wherein a transformer (Tr) and an inverter (S1, S2) are provided in the heating circuit of the tube (WR), and the frequency of the AC current is reduced from a high initial value to a lower value during the heat-up time of the tube (WR) in such a way that the change of the inductive voltage drop caused by this frequency change limits the heating current at the leakage inductance (LS) of the transformer (Tr).

9 Claims, 3 Drawing Sheets

TRAVELING WAVE TUBE HEATING COIL POWER SUPPLY WITH VARYING FREQUENCY AC CURRENT LIMITING MEANS

BACKGROUND OF THE INVENTION

1. Field of the Invention

The invention relates to an arrangement in constituting a power supply for supplying the heating coils of a tube, in particular a traveling-wave tube, wherein a transformer and an inverter are provided in the heating circuit of the tube.

2. Prior Art

As a rule, power amplifier tubes, in particular traveling wave tubes, are operated via current limiting regulators in the heating circuit, so that the heating current cannot increase to impermissible values. Such current limiting regulators in the heating circuit are known, for example, from U.S. Pat. No. 4,267,487 or from the pamphlets "Space Amplifier at 20/30 GHz", ANT 15 06 aE, 05.84; "Traveling Wave Amplifiers (TWTAs) for Space Applications" ANT 776 841, 09.90 of the firm ANT Nachrichten-technik GmbH.

In a voltage regulator known from U.S. Pat. No. 4,257,089, the frequency of a push-pull switching regulator is varied as a function of an error voltage on the output side. Thus, with a large error deviation, less energy is transmitted to the load.

In the limitation device in accordance with U.S. Pat. No. 4,267,487, the tube is supplied with DC current. AC components are suppressed in that the voltage at the heating filament is detected and a negative feedback signal is generated which controls an impedance in the supply circuit.

In a device known from the IEEE Conf. Rec. of the 1988 18th Power Modulator Symposium, pages 269–273 "Filament Considerations for High Stability Radar", the fluctuations in the heating voltage caused by frequency changes of the heating current are suppressed by a special coil geometry of the secondary coil of a HV transformer.

SUMMARY OF THE INVENTION

It is the object of the invention to provide a current limiter for the arrangement constituting a power supply for supplying the heating coils of a tube, in particular a traveling-wave tube, wherein a transformer and an inverter are provided in the heating circuit of the tube, which causes little additional outlay and which is particularly suited to limit the heating current when the heating coil is cold. This object is attained by reducing the frequency of the AC current from a high initial value to a lower value during the heat-up time of the tube in such a way that the change of the inductive voltage drop caused by this frequency change limits the heating current at the leakage inductance of the transformer. Preferred embodiments will be described below.

The invention is based on the following realizations: the transformer in the heating circuit of a tube, for example a traveling wave tube, has a leakage inductance which, in particular in case of a transformer which supplies a high-voltage potential, can assume considerable values. If now a relatively high frequency is selected for the AC heating current, for example 200 kHz, in the start-up phase of tube heating, when the heating coil is still cold and has a low cold resistance of, for example 1 Ohm, a large portion of the AC heating current drops off at the leakage inductance. Additional current limitation, for example in the form of a series regulator, for limiting the heating current to impermissible values is then no longer required. In the heated state the heating coil has a greater resistance of, for example 10 Ohms, and the frequency of the AC heating current can then be reduced to a lower nominal value of, for example, 10 kHz. The high initial value of the frequency of the AC heating current is advantageously adapted to the value of the leakage inductance of the transformer in such a way that no impermissibly high heating current can flow in any case.

In a further embodiment, the transformer can be supplemented by two electronic push-pull switches to form a push-pull inverter. Control of these switches can be integrated in an application specific intergrated circuit (ASIC), so that the additional outlay for realizing the invention is low.

The frequency of the AC heating current can be lowered in steps in a further embodiment, for example by an oscillator which is frequency-controlled via a timer, or by a fixed oscillator, the output signal of which is passed to the control inputs of the electronic switches via a frequency divider with divider rates controlled as a function of time.

BRIEF DESCRIPTION OF THE DRAWINGS

Exemplary embodiments of the invention will now be explained in detail by means of the drawings. Shown are in.

DESCRIPTION OF THE PREFERRED EMBODIMENTS

Figure 1:
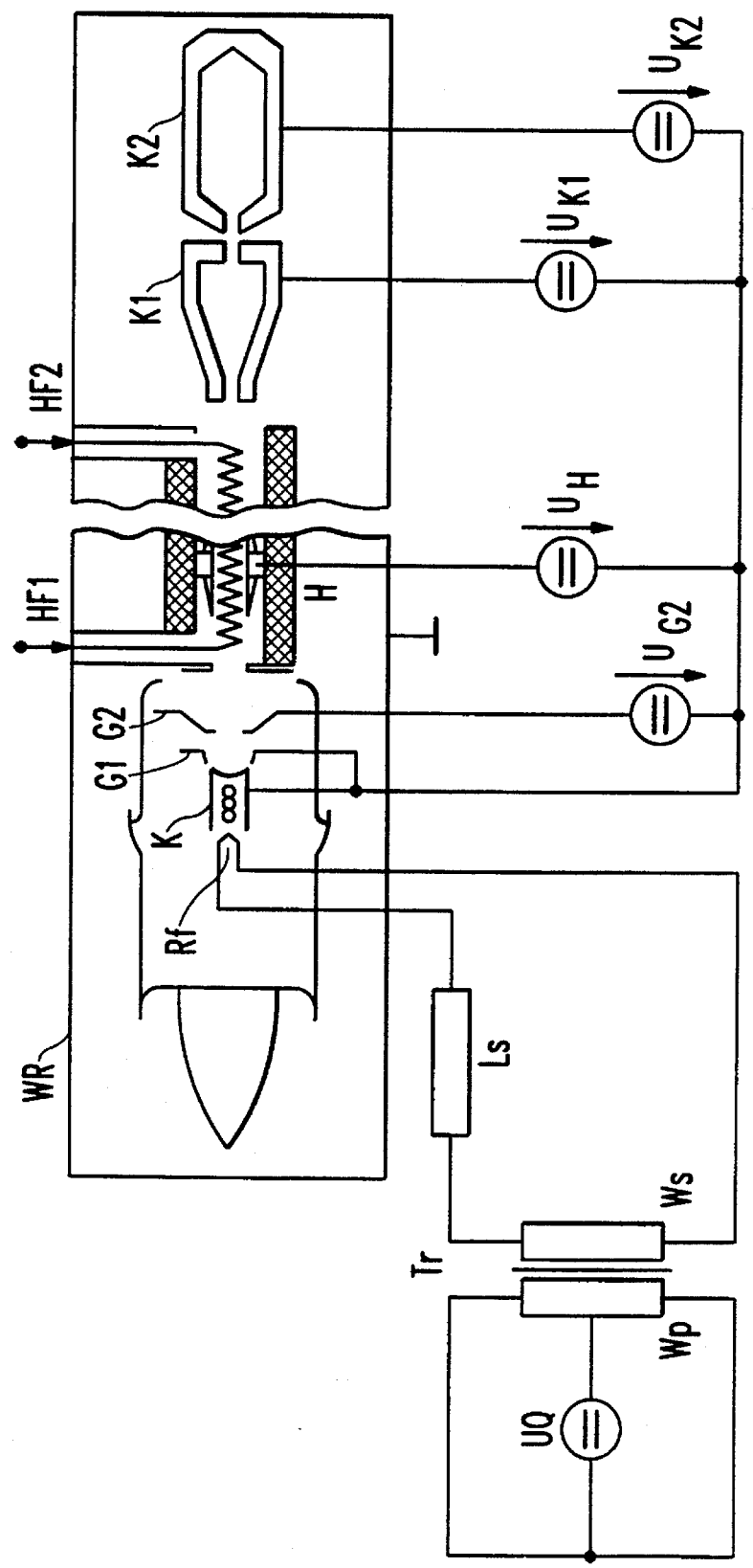
FIG. 1 is a basic circuit diagram of the current limiter in accordance with the invention.

A transformer Tr in the heating circuit of a traveling-wave tube WR with its leakage inductance Ls in the secondary circuit is illustrated in FIG. 1. The heating filament of the traveling-wave tube is connected in series with this leakage inductance Ls and is represented as an ohmic resistance Rf. The AC heating current for the traveling-wave tube is supplied by a DC voltage source UQ, one side of which is connected with the center tap of the primary coil $W_p$ of the transformer Tr and the other side with the ends of the primary coil $W_p$ via respective electronic switches S1 and S2. The switches S1 and S2 are controlled to be alternatingly conducting, so that the circuit shown in FIG. 1 operates as a push-pull inverter.

In a constructed example, the cold resistance Rf of the heating filament is approximately 1 Ohm. The nominal resistance in the heated state is 10 Ohms. At a heating filament resistance of 10 Ohms, the nominal heating current is approximately $J_{Fnom} \approx 650$ mA. The maximally permissible heating current is limited to approximately $J_{Fmax} \approx 1000$ mA. This result occurs because in the cold state the heating coils of the traveling-wave tube cannot be allowed to be connected with the nominal AC heating voltage. Thus, a limitation of the heating current is necessary.

The invention proceeds from the fact that the heating transformer Tr, which in case a traveling-wave tube is used, is a high-voltage transformer with high-voltage insulation between the primary coil $W_p$ and the secondary coil Ws, has a relatively large leakage induction Ls on an order of magnitude of 10 μH up to approximately 30 μH. The usual frequency of the AC current for the tube heating lies between 6 and 20 kHz. The nominal heating voltage Uf lies between 4.5 V and 5.5 V.

If, in accordance with the invention, a high frequency is selected for the AC heating current during the start-up phase while the heating coil is still cold, a large portion of the AC voltage drops off at the leakage inductance Ls. An additional current limitation, for example by means of an in-phase regulator, is no longer necessary. In an exemplary embodiment, the frequency of the AC current—switching frequency for the AC current—was reduced in several steps, for example eight, from approximately 200 kHz to a nominal frequency of 10 kHz within approximately 30 seconds. The high initial value depends on the respective design of the heating transformer Tr or its leakage inductance Ls. In an advantageous manner, the high initial value is therefore selected as a function of the size of the leakage inductance Ls in such a way that it is possible in all cases to stay within tube threshold values. As soon as the leakage inductance Ls for a heating transformer has been determined, the same start-up conditions can be selected for further traveling-wave tubes, because the leakage induction remains the same as a result of the same mechanical structure of further transformers.

The realization in accordance with the invention is particularly useful if digital circuits are provided anyway for other purposes in the EPC (electronic power conditioner) of the ASIC of a satellite power supply. In this case the control of the switches S1 and S2 can be integrated in such an ASIC.

Triggering of the push-pull switches S1 and S2 can preferably be performed during a gap period, in particular in accordance with EP 00 77 958 B1.

Figure 2:
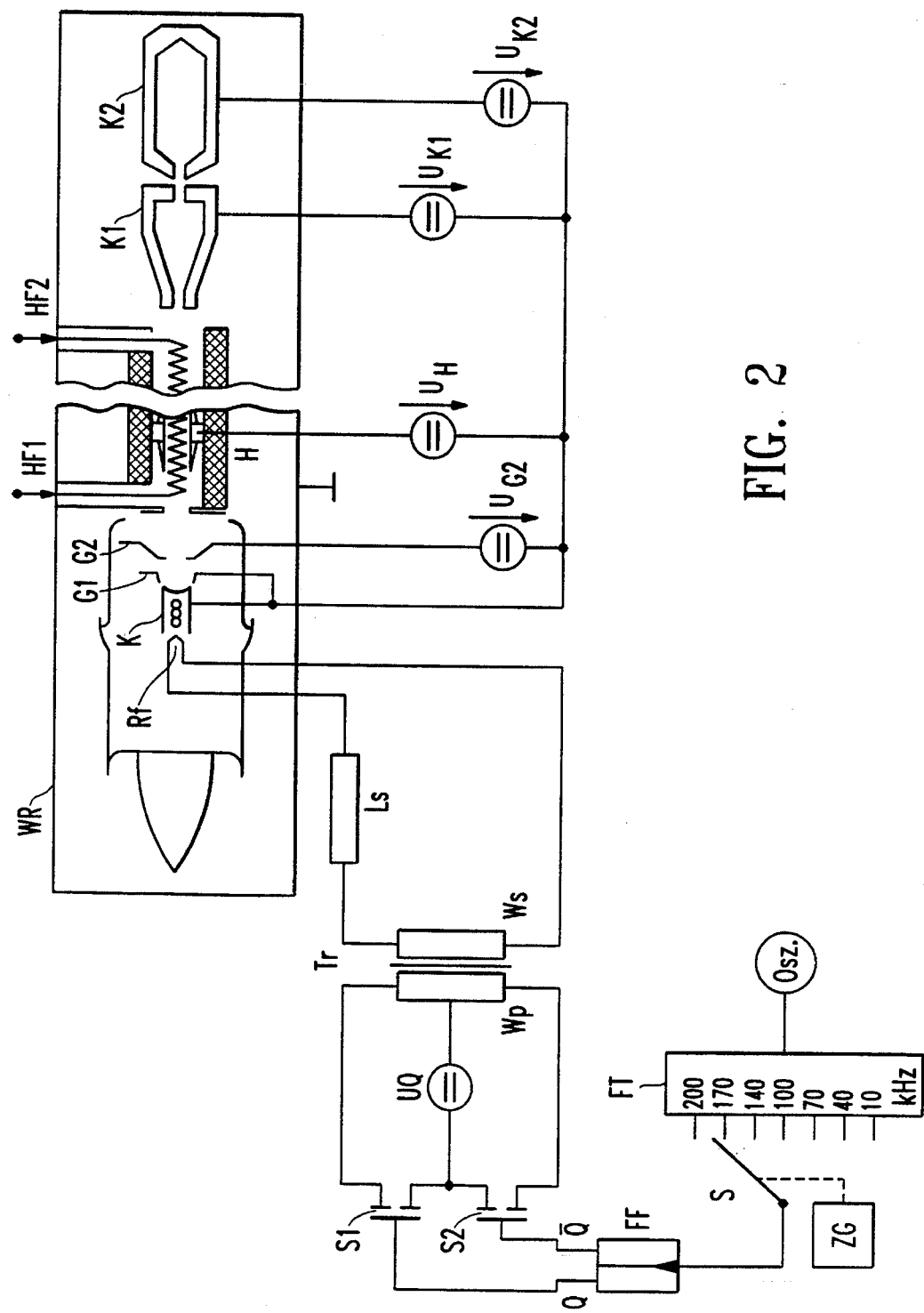
FIG. 2 shows a first example for generating control signals for electronic push-pull switches.

In an exemplary embodiment in accordance with FIG. 2, the push-pull signals for the electronic push-pull switches S1 and S2, are embodied here as FETs, are derived from an oscillator Osc with a constant output frequency, the output signal of which is divided by a frequency divider FT emitting eight differently divided output signals, for example 200 kHz, 170 kHz, 130 kHz, 100 kHz, 70 kHz, 40 kHz, 10 kHz. The switch S, which is controlled by a timer ZG, determines which one of these divided output signals is forwarded to a flip-flop FF. A multivibrator, for example, can be employed as a timer, which during the heat-up time of approximately 40 seconds switches a different frequency through to the flip-flop FF every five seconds.

Figure 3:
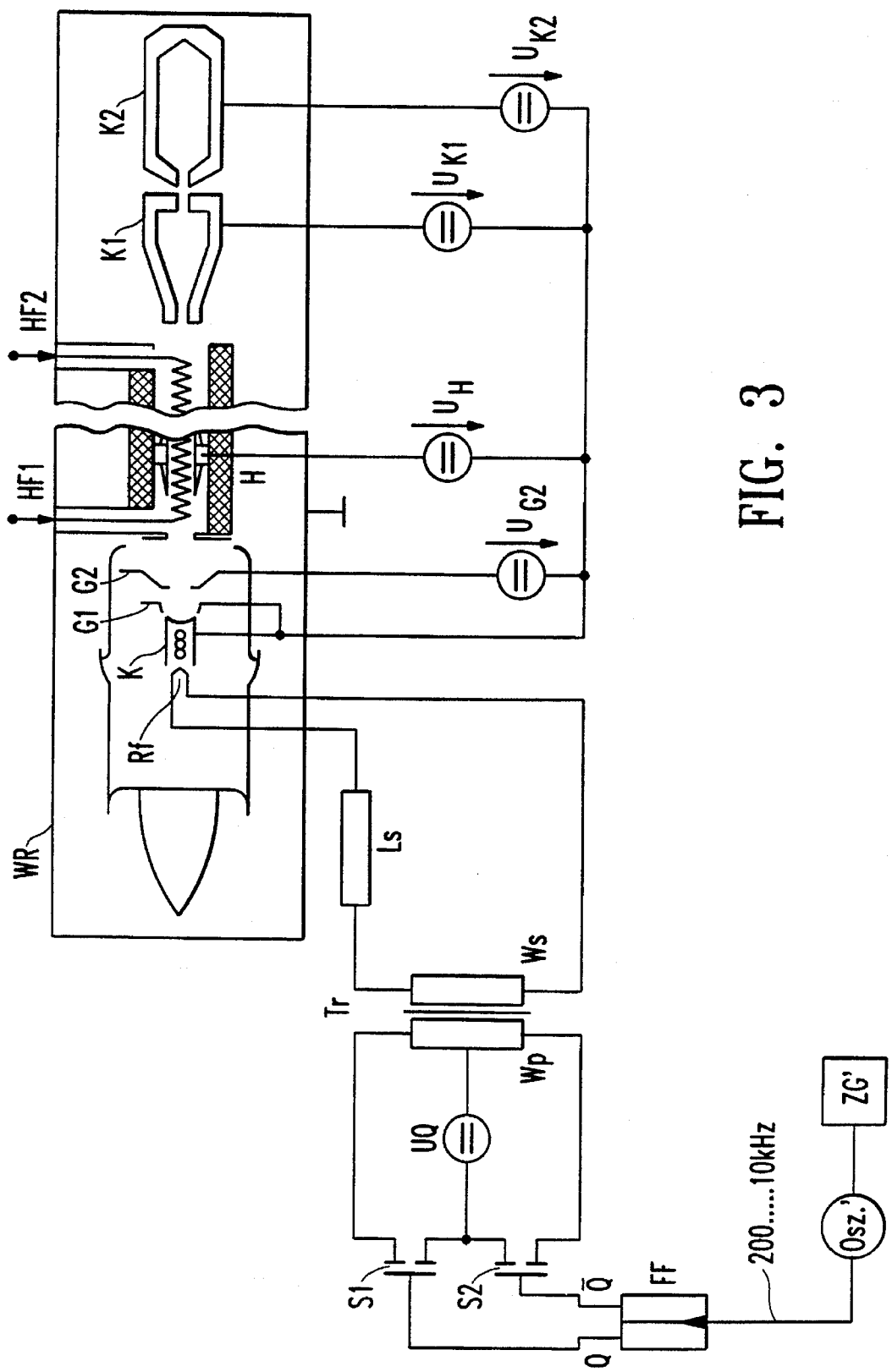
FIG. 3 shows a second example for generating control signals for electronic push-pull switches.

In a further embodiment (FIG. 3), an oscillator Osc' is used, the output frequency of which is varied by of a timer ZG' between 200 kHz and 10 kHz during the heat-up time. Such an oscillator Osc' can be constructed in the form of a VCO together with the timer ZG', for example again in the form of a multivibrator with a downstream counter, by means of integrated standard circuits.

I claim:

1. A power supply for supplying heating coils of a tube (WR), in particular a traveling-wave tube, with an AC current having a frequency, wherein a transformer (Tr) having a leakage inductance (LS) and an inverter (S1, S2) are provided in a heating circuit of the tube (WR), characterized in that the power supply comprises means for reducing the frequency of the AC current from a high initial value to a lower value only during a start-up phase of the tube (WR) in such a way that a change of an inductive voltage drop caused by this frequency change limits the AC current at the leakage inductance (LS) of the transformer (Tr), wherein said means for reducing the frequency comprise oscillator means for producing an output signal having a frequency with any one of a plurality of frequency values, and a timer connected to said oscillator means for changing the output signal frequency from one value to another as a function of time.

2. An arrangement in accordance with claim 1, characterized in that the high initial value of the AC current is selected as a function of the size of the leakage inductance (Ls) of the transformer (Tr).

3. An arrangement in accordance with claim 1, characterized in that the frequency of the AC current is variable at a ratio of approximately 20:1.

4. An arrangement in accordance with claim 1, characterized in that said means for reducing the frequency of the AC current acts to reduce the frequency, starting at approximately 200 kHz, to a nominal frequency of 10 kHz, for example, within approximately 40 seconds.

5. An arrangement in accordance with claim 1, characterized in that said means for reducing the frequency of the AC current acts to reduce the frequency in steps.

6. An arrangement in accordance with claim 1, characterized in that the transformer (Tr) is complemented to form a push-pull inverter by means of at least two electronic push-pull switches (S1, S2).

7. An arrangement in accordance with claim 1, wherein said oscillator means comprise a controllable oscillator for producing the output signal, said timer being connected to said controllable oscillator for varying the frequency of the output signal produced by said controllable oscillator.

8. An arrangement in accordance with claim 1, wherein the plurality of frequency values includes more than two frequency values.

9. An arrangement in accordance with claim 1 wherein said oscillator means comprise an oscillator producing an oscillation at a fixed frequency and a controllable frequency divider connected to divide the frequency of the oscillation to produce the output signal, said frequency divider being connected to be controlled by said timer.

* * * * *